United States Patent [19]

Yazawa

[11] 3,763,407

[45] Oct. 2, 1973

[54] SOLID STATE OSCILLATOR-DETECTOR DEVICE OF ELECTROMAGNETIC WAVES

[75] Inventor: Kazuhiko Yazawa, Chofu, Japan

[73] Assignee: Hitachi, Ltd., Japan

[22] Filed: Mar. 3, 1971

[21] Appl. No.: 120,510

Related U.S. Application Data

[63] Continuation-in-part of Ser. No. 688,544, Dec. 6, 1967, abandoned.

[30] Foreign Application Priority Data

Dec. 14, 1966 Japan ............................... 41/81497

[52] U.S. Cl. .......... 317/235, 317/235 H, 317/235 N, 317/235 AC, 317/235 AP, 317/235 AS, 331/94.5, 313/108 D

[51] Int. Cl. ........................ H05b 33/00, H01l 15/00

[58] Field of Search .............................. 331/94.5 H; 317/235 N, 235 AC, 235 H

[56] References Cited

UNITED STATES PATENTS

| | | | |
|---|---|---|---|
| 3,678,302 | 7/1972 | Kasano et al. | 317/235 AC |
| 3,309,553 | 3/1967 | Kroemer | 313/108 |
| 3,309,586 | 3/1967 | Kleinknecht | 317/235 H |
| 3,353,114 | 11/1967 | Hanks et al. | 331/94.5 |
| 3,245,002 | 4/1966 | Hall | 331/94.5 |
| 3,398,301 | 8/1968 | Suzuki | 307/299 |
| 3,456,209 | 7/1969 | Diemer | 331/94.5 |

OTHER PUBLICATIONS

Phelan et al., "Infrared InSb Laser Diode in High Magnetic Fields", Applied Phys. Lett. Vol. 3, No. 8.

Bell et al., "Mechanism of Band-Gap Laser Action In InSb Diodes," Applied Phys. Lett. Vol. 5, No. 1.

*Primary Examiner*—Martin H. Edlow
*Assistant Examiner*—William D. Larkin
*Attorney*—Craig, Antonelli, Stewart & Hill

[57] ABSTRACT

A solid state oscillator-detector of electromagnetic waves which makes use of electron transitions between Landau levels in a solid state element to which a magnetic field is applied. The element has two semiconductor regions which are in contact with each other and exhibit different Landau level systems in an applied magnetic field, and when an electric current is either passed through the element subjected to a magnetic field, electromagnetic waves are emitted or absorbed at the junction layer to perform either the generation or detection of electromagnetic waves respectively.

19 Claims, 10 Drawing Figures

Patented Oct. 2, 1973

3,763,407

3 Sheets-Sheet 1

Patented Oct. 2, 1973 3,763,407

3 Sheets-Sheet 2

SOLID STATE OSCILLATOR-DETECTOR DEVICE OF ELECTROMAGNETIC WAVES

This is a continuation in part of application Ser. No. 688,544, filed Dec. 6, 1967, now abandoned, entitled A SOLID STATE OSCILLATOR-DETECTOR DEVICE OF ELECTROMAGNETIC WAVES This invention relates to a solid state electronic device for emitting or detecting electromagnetic waves and more particularly to the electronic transitions between quantized energy levels in a solid state element.

It is one of the important subjects in the field of the electronics to provide an excellent solid state electronic device for emitting or detecting electromagnetic waves in a submillimeter wave region. Accordingly, the main object of this invention is to provide a solid state oscillator-detector device of electromagnetic waves comprising a rigid and small sized solid state element easy to construct.

Another object of this invention is to provide a solid state oscillator-detector device of electromagnetic waves wherein the wavelength of the electromagnetic wave to be emitted or detected (i.e., to be absorbed ) can be changed easily and continuously.

A further object of the invention is to provide a solid state oscillator-detector device of electromagnetic waves wherein the wavelength of the emitted electromagnetic wave can be modulated easily.

A yet further object of this invention is to provide a solid state oscillator-detector device of electromagnetic waves wherein stimulated emission occurs when emitting electromagnetic waves and thereby laser oscillation is induced.

The foregoing and other objects are achieved according to this invention, and the device according to this invention is, briefly stated, a solid state electronic device comprising means for applying a magnetic field to a solid state element having two semiconductor regions which are in contact with each other, the electronic energy levels being bunched into mutually different system of Landau levels in said respective regions by said applied magnetic field; and means for passing an electric current through the junction layer, wherein the electronic transition between the Landau levels occurs at the junction layer to emit or absorb electromagnetic waves.

Figures 1, 2, 3, 6:
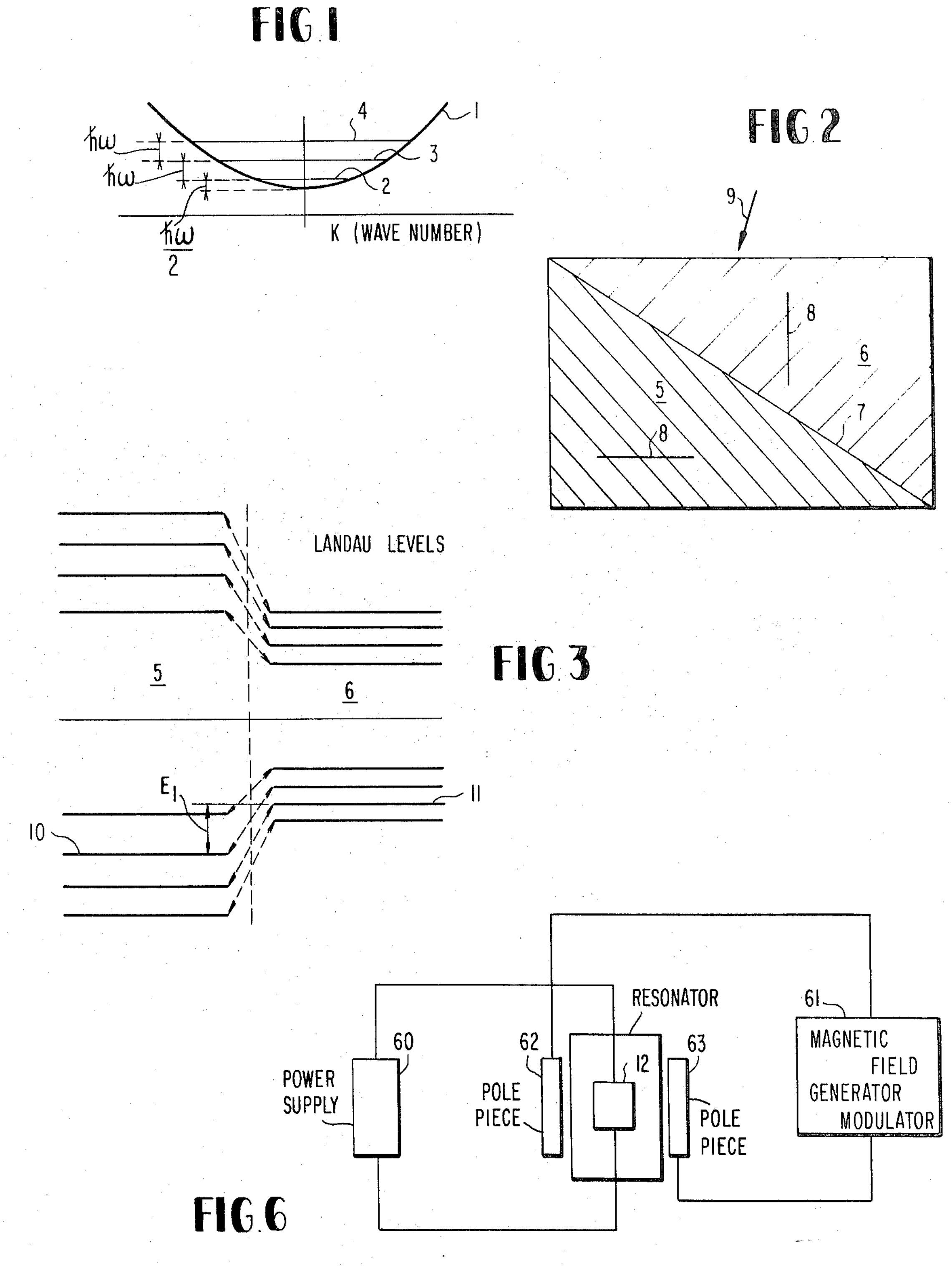
Figure 5:
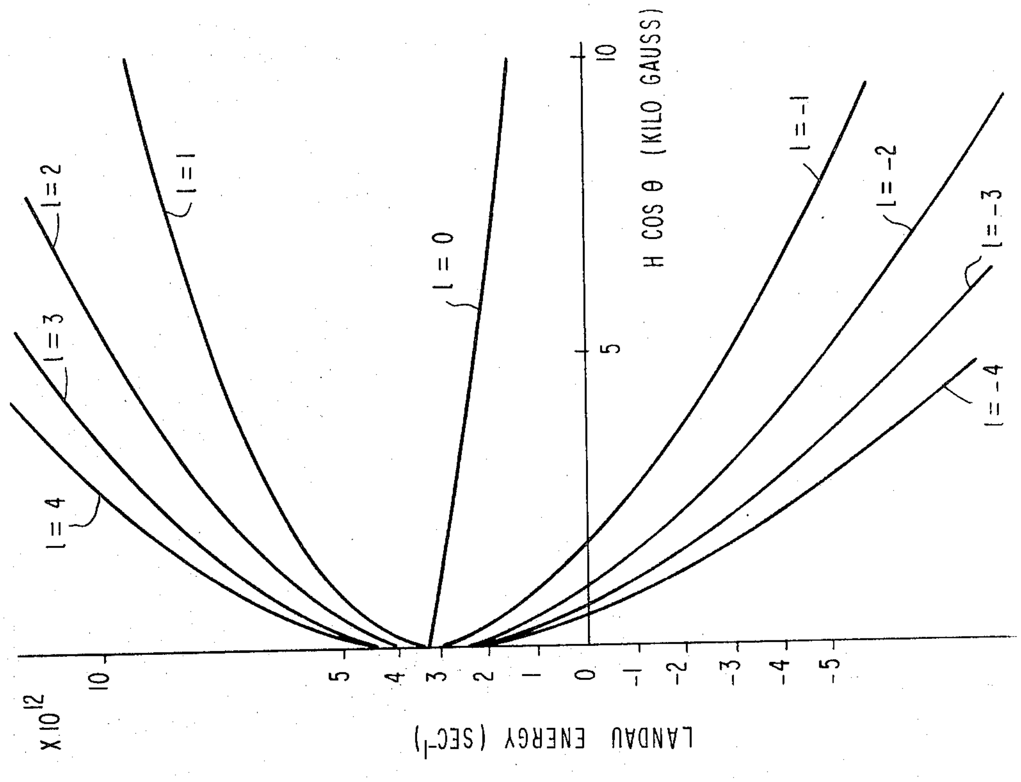
Figure 4:
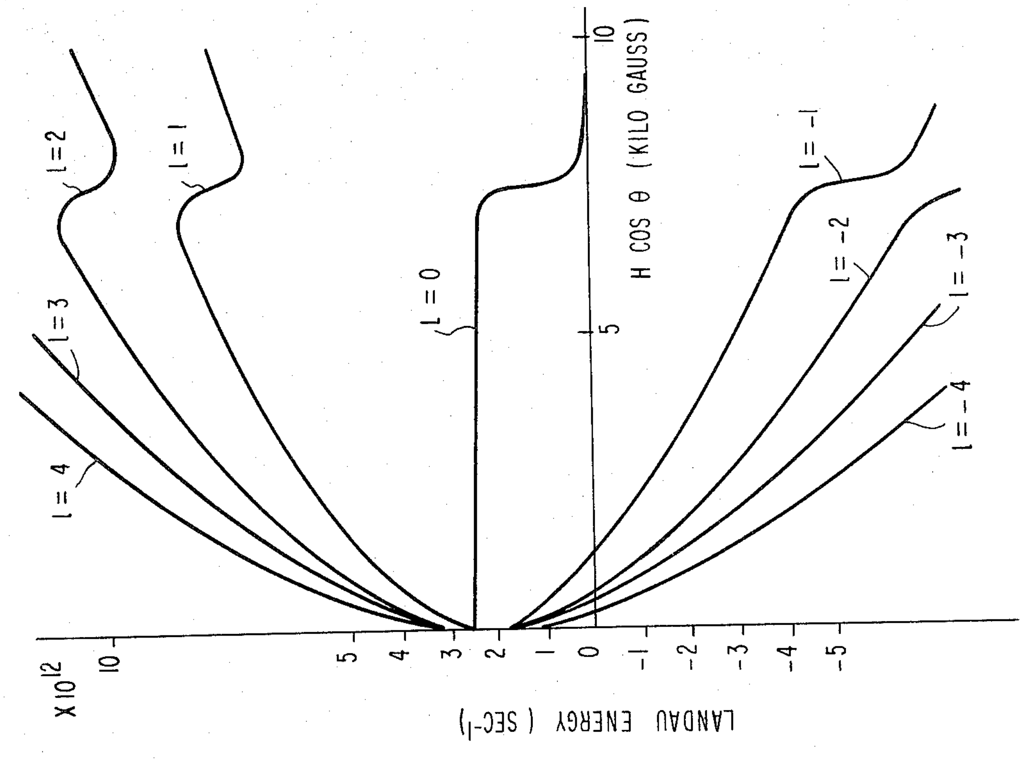
Figure 7:
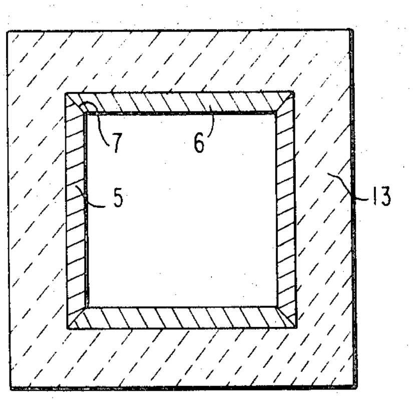
Figure 8:
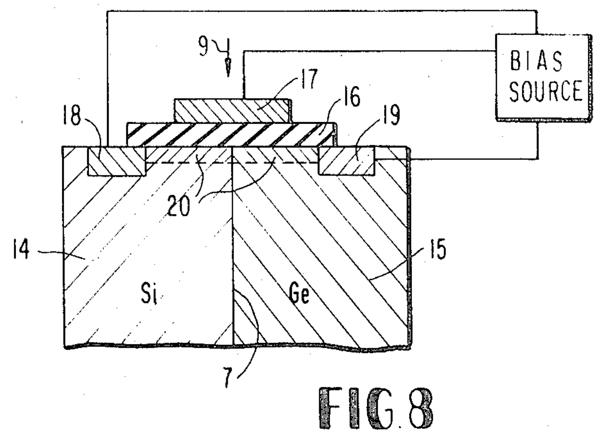
Figure 9A:
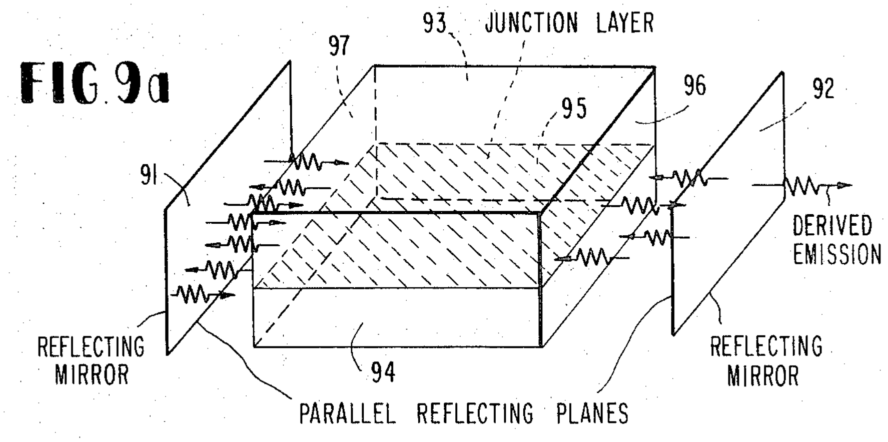
Figure 9B:
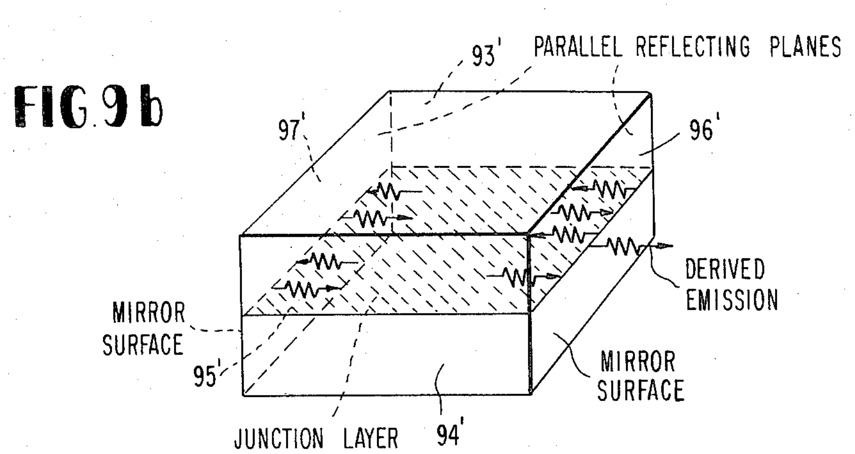

The principle, features and advantages of this invention will become more apparent from the following detailed description of the invention when taken in conjunction with the accompanying drawings wherein the same parts are indicated by the same reference numerals; in which, FIG. 1 is a schematic diagram illustrating the change of the electronic energy levels of the solid due to the application of a magnetic field, FIG. 2 is a cross-sectional view showing the structure of an embodiment of this invention, FIG. 3 is a schematic diagram showing the energy levels in the two regions of said element qualitatively, FIGS. 4 and 5 are schematic diagrams showing the allowed energy levels in the element when said element is maintained at temperatures of 4.2° K and 77°K, respectively, FIG. 6 is a block diagram showing the connection arrangement of an embodiment of this invention, FIG. 7 is a cross-sectional view showing a manufacturing process of the element shown in FIG. 2, and FIG. 8 is a cross-sectional view showing the structure of another element embodying this invention, FIGS. 9*a* and 9*b* show laser structure into which the present invention may be formed.

Generally, when a magnetic field is applied to crystals of metals, semiconductors, etc., the transverse motion of the carriers in the crystal to the magnetic field is quantized and this motion has discrete energy levels and so-called Landau levels appear. An energy diagram of a conduction band of a general isotropic crystal is shown in FIG. 1, wherein the abscissa indicates the wave number vector and the ordinate indicates the energy value. In the figure, curve 1 shows an energy diagram when no magnetic field is applied and the bottom is a parabolic curve. When a magnetic field is applied to said crystal, the lowest quantum level 2 increases by $\hbar\omega/2$ are further Landau levels 3, 4 etc. higher by $\hbar\omega$ are induced, where is the Planck's constant h divided by $2\pi$ $\omega$ is the angular frequency of the cyclotron motion of the carriers perpendicular to the magnetic field and is given by the relation $$\omega = eH/m^*c,$$

where e is the charge of the carrier, $m^*$ is the effective mass of the carrier, $H$ is the intensity of the applied magnetic field and c is the light velocity.

The energy levels in an isotropic crystal have been described hereinabove, but in an anisotropic crystal, the effective mass of the carrier changes with the orientation of the crystal .

Now, when an electric current is passed across a junction layer in a junction element comprising two regions where mutually different Landau level systems appear when a magnetic field is applied, the carriers jump from an allowed level of one region to a level of the other region at the junction layer and photons and/or phonons are emitted or absorbed due to said electronic transition between said levels.

In the following, an embodiment of this invention comprising an element made of pyrolytic graphite will be described in detail.

FIG. 2 shows a cross-sectional view illustrating the structure of such an element. In the FIG. 5 and 6 indicate crystal wafers of pyrolytic graphite. The wafers are joined at a junction layer 7 and layer planes 8 of said wafers cross perpendicularly or obliquely. Reference numeral 9 indicates a direction in which a magnetic field is applied to the element.

The present Inventor has discovered that the energy levels of a pyrolytic graphite have a two dimensional Landau level structure shown by $$E = \epsilon_0 \pm \sqrt{klH \cos\theta}$$

when a magnetic field is applied, wherein $K$ is a material constant showing a larger value as the effective mass becomes smaller, 1 is a quantum number which is an integer like 0, 1, 2, $H$is the intensity of the applied magnetic field, $\phi$ is an angle between the applied magnetic field and the crystalline $c$ or $z$ axis of the wafer, and $\epsilon_o$ is the energy value for $1 = 0$.

When a magnetic field is applied to an element in a state as shown in FIG. 2, the applied magnetic field 9 imposes different influences on the motion of the carriers on the layer or *ab* planes of the crystal wafers 5 and 6 because of the value of $\phi$ is different in the wafers 5 and 6. Accordingly, the Landau levels of the wafers 5 and 6 are different as shown qualitatively in FIG. 3.

The identifying characters $a$,$b$ and $c$ to identify crystalline planes are to be taken in their well known context, each plane $a$, $b$ and $c$ being respectively perpendicular to the other two crystalline planes, and a complete physical analysis of the planar structure of pyrolytic graphite has been treated, for example, by K. Lonsdale in the article "Crystals and X-rays" published by G. Bell and Sons, Ltd. 1948 and by Philip L. Walker in the article "Chemistry and Physics of Carbon" from the Fuel Science Department of Pennsylvania State University, Volume 2, published by Marcel Dekker, Inc. New York, 1966.

In FIGS. 4 and 5, the Landau energy of a crystal of pyroltic graphite having an activation energy of $0.01eV$, including acceptors of $10^{18}$ atoms/$cm^3$ in concentration, and maintained at respective temperatures of 4.2°K and 77°K is shown in the unit of frequency as a function of the effective magnetic field $H\cos\phi$.

If the energy levels are as shown in FIG. 3, the electrons must receive energy $E_1$ to jump from the level 10 to the level 11 when the carrier particles are transferred from the wafer 5 to the wafer 6 on the respective layer or ab planes. Accordingly, when photons, that is, an electromagnetic wave having said energy is absorbed by the element, the current passing through said two wafers increases, so that presence of the electromagnetic wave can be detected, as the change in the electric current through the element. Conversely, when carrier particles are transferred from the wafer 6 to the wafer 5, energy in the form of photons and/or phonons are emitted due to the transitions of the electrons, so that an electromagnetic wave can be generated. Since the interaction between an electron and a lattice is weak in pyrolytic graphite, energy emitted from said electron is converted into photons with a relatively high efficiency and an electromagnetic wave is radiated. As is evident from the above formula, the Landau levels of each wafer change continuously with the applied magnetic field and thus, the energy of the electromagnetic wave absorbed or emitted can be changed continuously over a wide range. Further, it is easy to perform frequency modulation to the radiating electromagnetic wave by superposing a signal or modulating magnetic field onto the applied magnetic field or providing means for changing $\phi$ in correspondence to the signal.

Of course, such an apparatus to create the modulating magnetic field may take many different forms which are well known to those of ordinary skill in the art. For example, the body structure may be disposed within a well known crossed coil in which the field rotates with the same period as the AC current flowing through the coil, thus causing the respective Landau levels formed in both regions to vary with a period in the frequency of the modulating signal. Likewise, the body may be disposed within the pole gap of an electromagnet with a pair of coils surrounding the poles thereof. Upon applying a DC bias current and modulating signal current to the electromagnet and coil respectively, the combined magnetic fields result in a modulation of the Landau levels and, of course, the modulation of the emitted electromagnetic wave.

FIG. 6 shows a block diagram of the connection of an embodiment of this invention, in which 12 indicates said joined pyrolytic graphite element. According to this embodiment, radiation of a submillimeter wave of 0.1 mm in wavelength was observed when a magnetic field of 4000 gausses was applied.

As can be seen from FIG. 6 a magnetic field generator 61 is connected to a pair of pole pieces 62 and 63, as discussed above, with power supply 60 biasing the element 12, the resonator structure, which may take the laser form to be discussed below in connection with FIGS. 9$a$ and 9$b$, modulation of the emitted wave is effected.

The pyrolytic graphite crystal composing said element has a layer structure and has quite a large anisotropy. Accordingly, the groups of Lanau levels at the time of application of the magnetic field also have a unique two dimensional structure and the carriers move substantially in the layer or ab plane of the crystal. Therefore, the energy level in the element and the transition between the levels are simple and the design of the device is also simple. Further, since the interaction between the electron and the lattice in the crystal is weak, the absorption and emission of an electromagnetic wave in the region ranging from an infrared wave to a millimeter wave can be done rather effectively.

Further, fabrication of an element of a pyrolytic graphite crystal is simple.

In FIG. 7, when a carbon compound is thermally cracked inside a hollow columnar substrate 13, pyrolytic graphite crystals 5 and 6 grow on the inner surfaces of the substrate in a layer form. The layer or ab planes of the grown crystal are always parallel with the substrate surfaces. Accordingly, the crystal grown near the arms where the two inner surfaces of the substrate cross comprise a junction layer 7 where the layer or ab planes of the crystal intersect. Thus, said junction element can be made easily.

In this case, the transition between the levels at the junction layer is theoretically considered as satisfying a condition $\Delta l = \pm 1$ because of the conservation of the angular momentum between electrons and photons and thus the wavelength of the electromagnetic wave emitted or absorbed when a magnetic field is applied is limited to several particular values.

More specifically, when a magnetic field is applied to a graphite crystal, the electrons in the crystal cause quantized cyclotron motion within the layer planes and have a quantized angular momentum of $l\hbar$. With such an electronic transition between two quantized levels so as to either absorb or emit a photon, conservation of angular momentum between the electron and photon must be maintained. Since, as is well known, the angular momentum of a photon is equal to $\hbar$. After the transition electrons have an angular momentum of $(l \pm 1)\hbar$. Therefore, during electronic transition accompanied by a photon absorption or emission, the change $\Delta l$ of the azimuthal quantum number $l$ defining the angular momentum of electrons is equal to $\pm 1$.

Though an element made of pyrolytic graphite in which carriers move only in the crystal layer or ab planes and are therefore influenced by the vertical components of an applied magnetic field to these planes has been described in detail in said embodiment, it is evident that an element made of other crystals having a layer structure can be used in a similar way.

Further, the element of this invention can be composed of anisotropic crystals not having a layer structure. Namely, when a magnetic field is applied to an element having a wafer of an anisotropic crystal joined to another wafer in a way that the crystal orientation is different, the Landau levels at the two wafers become different due to the change of the effective mass of carriers corresponding to the crystal orientation and said element can be used as the element according to said embodiment.

In an element wherein different crystals are joined, the effective mass of the carriers in the respective crystals is different and thus the different groups of Landau levels are found in the respective crystals when a magnetic field is applied. Therefore, it is possible to induce the transition between the levels at the junction layer.

As an example of an element comprising a junction of different crystals, an embodiment operated at the element surface where a Ge wafer is joined to a Si wafer will be described hereinbelow.

FIG. 8 is a cross-sectional view showing the structure of such an embodiment. In the figure, a P type Ge wafer 14 is joined to a P type Si wafer 15 at a junction layer 7. One side of said junction body crossing the junction layer 7 is coated with an insulating layer 16 (e.g., $SiO_2$ layer ) and the insulating layer 16 is coated with a conducting layer 17 ( e.g. evaporated metal ), thereby forming an MOS structure. Reference numeral 9 indicates the direction of the applied magnetic field.

In such a structure, when an intense electric field is applied between the conducting layer 17 and the junction bodies (14 and 15) a sharp potential drop appears in the junction body in the vicinity of the interface between the junction body and the insulating layer 16 and a thin and plane inversion layer 20 where the electron acts as a carrier is formed, extending in the surfaces of the Ge and Si wafers 14 and 15 and crossing the junction layer 7. Accordingly, the electrons in both the Ge portion and the Si portion of the inversion layer 20 are in a deep potential well. Therefore, the electrons are quantized in a direction 21 perpendicular to said interface and only the motion parallel with the interface can be allowed, so the electrons behave two-dimensionally. Further, when the magnetic field 9 is applied to the wafers 14 and 15, different groups or sets of Landau levels are formed in the Ge portion and Si portion of the inversion layer 20 in the wafers.

Thus, as is well known, in an MOS structure having a p type semiconductor an n type inversion layer, i.e., an n channel in which the electrons behave as the conductor carriers, is formed and a sharp potential drop appears on the semiconductor surface.

Also, electrons existing in the potential valley are quantized and therefore contain only discrete energy values. Thus, electron motion in a direction which will enable the electron to traverse the potential barrier is restricted and, therefore, free electron motion can take place only in planes parallel to the interface between the insulator and the semiconductor materials.

When a magnetic field is applied to the MOS structure, this free electron motion is further restricted by the quantized cyclotron motion and has discrete energy levels called Landau levels. These energy levels depend upon the effective mass of the electrons and, since the electrons in Si and G2 have different effective masses, different sets of Landau energy levels are formed in the *n* channels of the Si and Ge. As a result, the electrons flowing in the *n* channels must transit from one set of Landau levels to a different set of Landau levels at the junction between Si and Ge to thereby emit or absorb photons.

Thus, when an electric current is passed into Ge 14 and Si 15 between the $N^+$ layers 18 and 19 ( corresponding to a source and a drain of a field-effect transistor ) formed by a diffusion method, the electrons passing through said inversion layer lie in the different Landau levels in Ge and Si, and the transition between the levels occurs at the junction layer 7 to emit or absorb the electromagnetic wave.

In an element formed by joining different kinds of crystal materials, the wavelength of the electromagnetic wave to be emitted or detected can be varied over a wide range by the combination of the materials. When the effective masses of the electrons in two semiconductor materials joined together differ only slightly, the two sets of Landau levels formed in the materials will be nearly equal. On the other hand, when the effective masses of the electrons in the different materials are significantly different, then as a result, the sets of Landau levels are also widely spaced. Of course, the difference between the spacing of the Landau levels can be varied depending upon the various combinations of the semiconductor materials which are joined together. Thus, the amount of energy required for a transition between the levels varies with the combination of materials. As a result, by varying the combinations of the materials which can be joined together, the photon energy and therefore, the wavelength of the emitted or absorbed electromagnetic wave, can be varied over a wide range.

It is to be noted that the embodiment of the oscillator detector of the present invention as is shown in FIG. 8 has a heterjunction formed therein, as opposed to the structure of pyrolytic graphite. In this embodiment, an *n* channel, in which the motion of the electrons in a direction perpendicular to the interface between the insulator and the joined semiconductor materials is restricted, is formed on the surface of the joined semiconductor materials. Thus, as the electrons in graphite move two dimensionally on the layer planes, the electrons in this n channel body move two dimensionally also in planes parallel to the surface. Furthermore, the two dimensional motions of the electrons in the n channel is quantized due to the application of a magnetic field. A similar quantization occurs upon the application of a magnetic field effecting the layer planes in graphite. However, since the body made of graphite is so constructed that the layer planes of the two graphite wafers are oblique to each other, the vertical component of the applied magnetic field to the layer planes are different to each other in the two wafers and, therefore, different sets of Landau levels are formed therein, since it is the vertical components of the magnetic field which causes the quantization of the electron motion within the layer planes.

On the other hand, in a MOS structure such as depicted in FIG. 8, the electrons in the n channel move in planes parallel to the interface between the insulator and the joined semiconductors, the effective magnetic components causing the quantization of the motion of electrons in the n channel is the same in both semiconductor materials. However, since the Landau levels formed in a semiconductor dependds not merely on the applied magnetic field, but also an the effective mass of the electrons, different sets of Landau levels are formed in each n channel of two joined semiconductor materials having different effective masses, irrespective of the application of the same effective magnetic field to each n channel.

As has been previously explained, the MOS element, which has a heterojunction therein, has been disclosed in order to demonstrate the comparison between a structure made of graphite and to make evident that the formation of different sets of Landau levels in the two crystal wafers results due to the difference of the effective magnetic fields applied and the effective masses of the electrons in the materials.

Hence, the exemplary embodiment depicted in FIG. 8 is merely an illustrative example of the present invention, wherein the effective mass of the electrons within the materials is different.

Although the heterojunction has been disclosed to be formed by Si and Ge, it is obvious to one of ordinary skill in the art that such a heterojunction could be formed by III-V group semiconductor materials, such as GaAs, InAs and GaP.

Simple emission or absorption of the electromagnetic wave due to the transition between the levels in the elemtent has been described in the foregoing explanation.

However, when a large number of carriers exist in the element and intense current flows across the junction layer, a multiplicity of electronic transitions between Landau levels occurs at the junction layer and thus, the probability of effecting stimulated emissions is increased. Hence, when the element is equipped with a pair of reflecting surfaces to form a well known Fabry-Perot etalon, for providing a standing wave of the radiation emitted at the junction layer, and when a current larger than the threshold current is passed across the junction layer, lasing may be effected in a manner similar to that occurring in a conventional junction laser. The pyrolytic graphite has carriers of more than $10^{18}$ $cm^{-3}$ in many cases and is, therefore, adequate to be employed as the laser material. It is well known in the conventional PN junction laser art that a resonator cavity is provided to increase the probability of stimulated emission whenever light intensity is quite strong ( i.e., when spontaneous emission of the recombination of electrons and holes occurs very closely in time and space ). The parallel reflecting planes may be formed according to the way the semiconductor structure is cut to thereby provide a standing wave existing within the structure and enabling stimulated emission to occur within the junction layer existing between the parallel planes.

Attention may be directed to FIGS. 9*a* and 9*b* for an illustration of such a physical structure of a junction laser resonant cavity in accordance with the present invention which structure is similar to that of a conventional PN junction laser. As is shown in FIG. 9a a pair of different semiconductor crystals 93 and 94, which are made and arranged like wafers 5 and 6 shown in FIG. 2 or like portions of wafers 14 and 15 within the inversion layer 20 shown in FIG. 8 form a junction layer 95 like 7 shown in FIGS. 2 or 8 at their intersecting surfaces. Disposed perpendicular to the junction layer 95 and spaced from surfaces 96 and 97 of the semiconductor structure are a pair of parallel aligned mirror surfaces 91 and 92. At least one of the surfaces 91 and 92 is semitransparent to permit transmission of light therethrough. When current flows across the junction layer due to the application of an electric field to the junction structure, photons are emitted from the junction layer 95. As the emitted photons are reflected back and forth between reflecting mirror surfaces 91 and 92, a standing wave is established. When a current larger than the threshold level of the structure of the present invention is caused to flow by the application of a strong electric field, a standing wave is established which eventually increases to enable coherent light emission to exit the semitransparent mirrored surface.

Rather than employ a pair of external mirror surfaces 91 and 92, shown in FIG. 9*a*, the semiconductor structure may have its end surfaces 96' and 97', as shown in FIG. 9b, cut and polished perpendicular to the junction layer95'. In this manner end surfaces 96' and 97' act as partially reflecting mirror surfaces to permit the creation of a standing wave therebetween, so as to produce lasing.

As is understood from the foregoing description of various forms of the invention, the element according to this invention is formed by joining two regions and emits or detects ( absorbs ) electromagnetic waves at the junction layer. Accordingly, the element has such advantages as simplicity, rigidity and small size.

This invention has other advantages that the wavelength of the electromagnetic wave to be emitted or absorbed can be varied continuously over a wide range and that the wavelength of the emitted electromagnetic wave can be easily modulated. This invention has a further advantage that it is a solid state oscillator suitable for laser oscillation.

Though only some particularly preferred embodiments of this invention have been described in the foregoing disclosure, it is to be understood that any form of changes and modification of said embodiments without departing from the spirit of this invention should be included in this invention.

I claim:

1. A solid state oscillator-detector of electromagnetic waves comprising:

a body having separate regions joined together forming a junction therebetween, each region being made of a semiconductor material having carriers therein, and having in at least a part thereof such a portion that carriers move two-dimensionally on specific parallel planes;

means for inducing separate Landau energy levels in said portions, the levels in each portion being different with respect to the energy levels in another portion, and means for inducing electronic transitions from Landau levels of one of said portions to said Landau levels of another of said portions, whereby electromagnetic waves will be absorbed or emitted at said junction.

2. A solid state oscillator-detector according to claim 1, wherein each region of semiconductor material comprises an anisotropic semiconductor material having a crystal orientation different with respect to the crystal orientation of another region.

3. A solid state oscillator-detector according to claim 1, wherein said regions are made of different semiconductor materials forming a heterogeneous junction therebetween.

4. A solid state oscillator-detector according to claim 2, wherein said body is provided with a pair of electrodes in contact with said regions and said means for inducing electronic transitions comprises a power supply connected to said electrodes for causing carriers to drift across said junction.

5. A solid state oscillator-detector according to claim 2, wherein said means for inducing separate Landau energy levels comprises means for applying a magnetic field to said body.

6. A solid state oscillator-detector according to claim 4, wherein said means for inducing separate Landau energy levels comprises means for applying a magnetic field to said body.

7. A solid state oscillator-detector according to claim 2, wherein said anisotropic semiconductor material has a layer structure to induce the carriers therein to move two dimensionally.

8. A solid state oscillator-detector according to claim 7, wherein said anisotropic semiconductor material is pyrolytic graphite.

9. A solid state oscillator-detector according to claim 7, further comprising means for inducing stimulated emission of radiation at said junction with said body, whereby laser oscillation is produced from within said body.

10. A solid state oscillator-detector according to claim 3 , wherein said body has a surface substantially perpendicular to said region which is coated with an insulating layer, said insulating layer being coated with a conducting layer to form a metallic oxide semiconductor structure and means for providing an electric field between said body and said conducting layer across said insulating layer, whereby an inversion layer is formed in said body adjacent said insulating layer, so that carriers will drift across said junction within said layer to effect the emission or absorption of electromagnetic waves at said junction in said inversion layer.

11. A solid state oscillator-detector according to claim 10, wherein said different semiconductor materials are made of Ge and Si respectively.

12. A solid state oscillator-detector according to claim 10, wherein said body is provided with a pair of electrodes in contact with said region to which said means for providing an electric field is connected.

13. A solid state oscillator-detector according to claim 10, further comprising means for inducing stimulated emission of radiation at said junction within said body, whereby laser oscillation is produced within said body.

14. A solid state oscillator-detector according to claim 9, further comprising means for modulating the electromagnetic energy emitted by said body.

15. A solid state oscillator-detector according to claim 14, wherein said means for inducing separate Landau energy levels comprises means for applying a magnetic field to said body and wherein said modulating means comprises a means for superposing a modulating magnetic field onto the magnetic field applied to said body by said means for inducing separate Landau levels.

16. A solid state oscillator-detector of electromagnetic waves comprising:

a body having two regions joined together to form a junction therebetween, each region being made of a semiconductor material having carriers therein, and having in at least a part thereof such a portion that carriers move two-dimensionally in specific parallel planes, said carriers in said portions effecting cyclotron motions of different radii in said planes upon subjecting said body to a magnetic field;

means for applying a magnetic field to said body to induce Landau energy levels due to said cyclotron motions in said planes, the levels in each portion being different with respect to the energy levels in another portion; and means for applying such a voltage as to drift said carriers across said junction to said body to induce electronic transitions from Landau levels of one of said portions to Landau levels of another of said portions, whereby electromagnetic waves will be absorbed at said junction when said voltage has such a polarity as to cause said transition from lower levels to higher levels and will be emitted at said junction when said voltage has such a polraity as to cause said transition from higher levels to lower levels.

17. A solid state oscillator-detector of electromagnetic waves comrpising:

a body having two regions joined together to form a junction therebetween, each region being made of anisotropic semiconductor material and having a crystal orientation different with respect to the crystal orientation of another region;

means for applying a magnetic field to said body to induce Landau energy levels in said regions, the levels in each region being different with respect to the levels in another region due to the difference of said crystal orientations; and means for applying a bias voltage across said two regions to induce electronic transitions from Landau levels of one of said regions to Landau levels of another of said regions, whereby electromagnetic waves will be absorbed at said junction when said voltage has such a polarity as to cause said transition from lower levels to higher levels and said waves will be emitted at said junction when said voltage has such a polarity as to cause said transition from higher levels to lower levels.

18. A solid state oscillator-detector of electromagnetic waves comprising:

an MOS body made of a semiconductor crystal having two regions joined together to form a junction therebetween, said regions being made of different semiconductor materials to form a heterojunction, and having inversion layers in surface portions thereof, respectively, said inversion layer being joined together in said junction;

means for applying a magnetic field to said body to induce Landau energy levels in said layers, the levels in each layer being different with respect to the levels in another layer due to the difference of said materials; and means for applying a bias voltage across said two layers to induce electronic transitions from Landau levels of one of said layers to Landau levels of another of said layers, whereby electromagnetic waves will be absorbed at said junction when said voltage has such a polarity as to cause said transition from lower levels to higher levels and said waves will be emitted at said junction when said voltage has such a polarity as to cause said transition from higher levels to lower levels.

19. A solid-state oscillator-detector according to claim 13, further comprising means for modulating the electromagnetic energy emitted by said body.

* * * * *